L. F. & J. W. TARBELL.
FORGE.
APPLICATION FILED MAY 19, 1915.

1,285,464.

Patented Nov. 19, 1918.

2 SHEETS—SHEET 1.

WITNESSES:

INVENTORS

ATTORNEY.

L. F. & J. W. TARBELL.
FORGE.
APPLICATION FILED MAY 19, 1915.
1,285,464.
Patented Nov. 19, 1918.
2 SHEETS—SHEET 2.
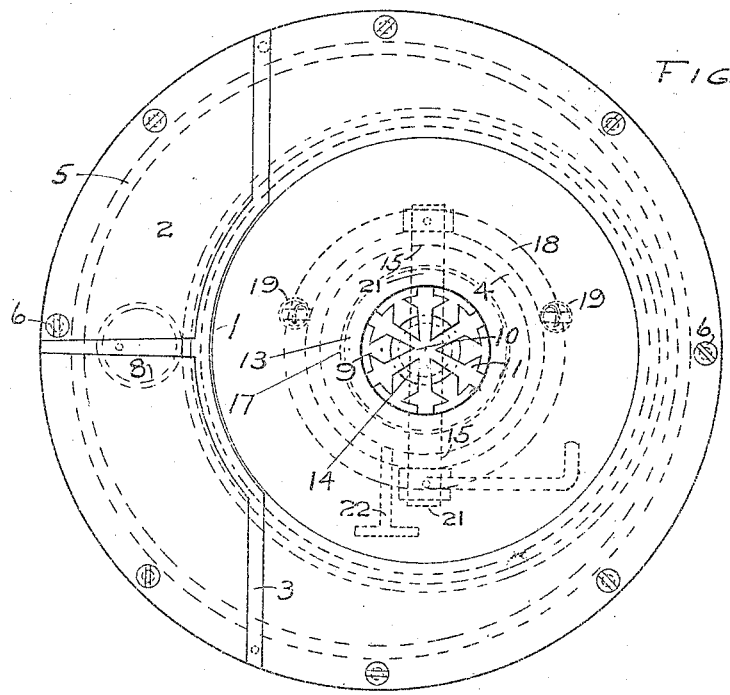
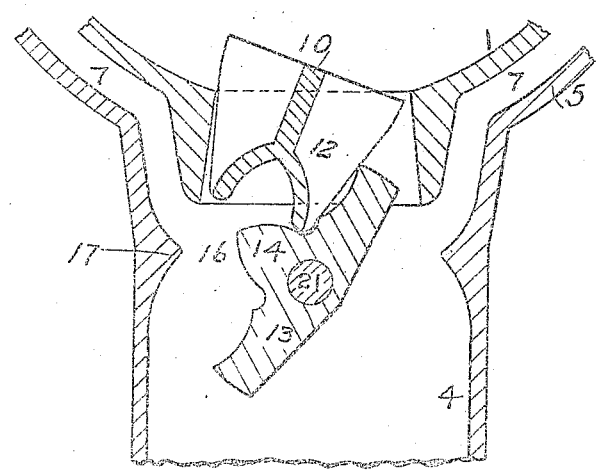

UNITED STATES PATENT OFFICE.

LEONARD F. TARBELL, OF DAYTON, NEW YORK, AND JAMES W. TARBELL, OF LANSING, MICHIGAN.

FORGE.

1,285,464.

Specification of Letters Patent.  Patented Nov. 19, 1918.

Application filed May 19, 1915.  Serial No. 29,238.

*To all whom it may concern:*

Be it known that we, LEONARD F. TARBELL and JAMES W. TARBELL, citizens of the United States, residing, respectively, at Dayton, in the county of Cattaraugus and State of New York, and at the city of Lansing, in the county of Ingham and State of Michigan, have invented a new and useful Improvement in Forges, of which the following is a specification.

Figure 1:
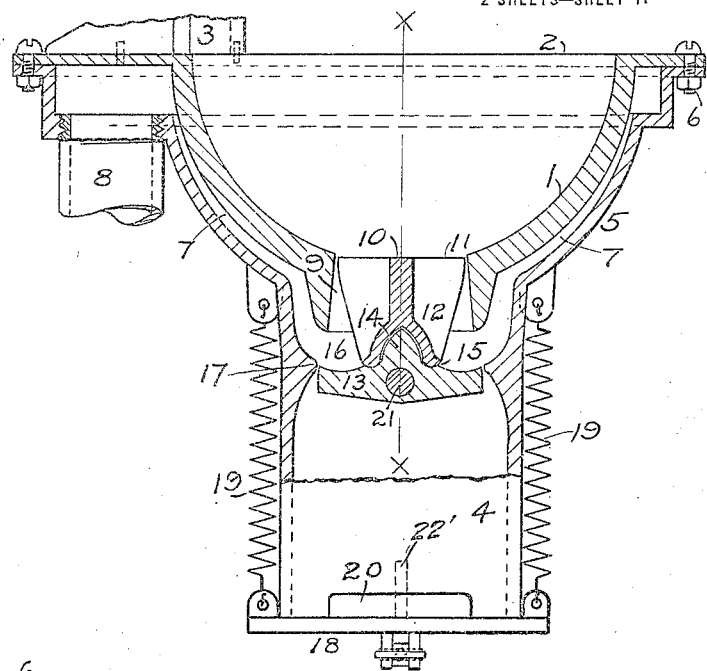
Figure 2:
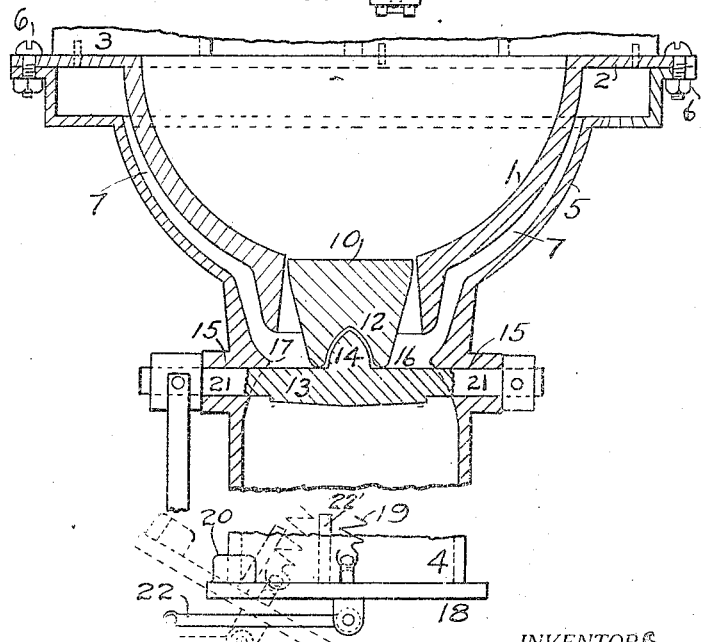

Our invention relates to blacksmith's forges and its purposes are to make a device that shall heat the air before passing it through the grate and that shall be readily and conveniently dumped and regulated. We attain these purposes by means shown in the accompanying drawings, in which Figure 1 is a central vertical section, taken at right angles to the grate shaking shaft. Fig. 2 is a central vertical section on the line x—x of Fig. 1. Fig 3 is a plan view from above and Fig. 4 is a detail, illustrating the position of the parts in shaking the grate.

Referring more particularly to the drawings, 1 is the fire pot or inner basin of the device which is provided with a horizontally extending flange of any approved size or shape. On this flange is removably mounted a vertically extending guard 3, which may also be of any preferred height or shape of the usual conventional type, the same being shown as broken away as the guard forms no particular part of my invention.

The cylindrical pocket or projecting portion 4 is extended upward and expanded into an outer basin, 5, which is secured to the flange, 2, in any suitable manner, as by bolts, 6. The outer basin 5 is separated from the fire pot 1 by a space, 7, forming an air chamber into which the air is introduced by a pipe 8, which is connected with any suitable source of air supply.

The fire pot 1 is provided with a central opening, 9, closed with a grate, 10. The grate bars 11 may be of any suitable shape adapted for the purpose. The main body, 12, of the grate extends downward through the central opening, 9, which is preferably somewhat larger at the bottom than at the top, so as to leave room for the shaking of the grate as hereafter described.

The grate, 10, is supported on the shaker, 13, provided with an upwardly extending tooth, 14, adapted to engage with a corresponding opening in the grate, and operate as a gear tooth for shaking the grate, and also with grate journals 15. The shaker or rocking bar 13 is of such size as to practically close the opening 16, in the ash receiving pocket, which is preferably contracted as shown at 17, where the two come together.

The ash receiving pocket or depending part of substantially circular formation is closed at the bottom by a lid, 18, which is retained in position by springs, 19. The lower extremities of these springs are connected to the lid, 18, substantially at its central line and the upper extremities are connected beyond the center of the lid 18 so that when the ashes are dumped as hereafter described the springs will pull at an angle as shown in Fig. 2, and thus serve the double purpose of pressing the lid against the lower end of the opening and bringing it backward so as to entirely close the opening to prevent the leakage of any ashes from the pocket.

A lug, 20, is provided at the front edge of the lid, 18, to prevent the lid from sliding too far in closing after the ashes are dumped, and a suitable pin 22′, to prevent the lid, 18, from sliding entirely off in dumping.

The shaker or rocking member, 13, is operated by a shaft, 21, and a crank or any other suitable means, and the lid, 18, is operated by a rod 22, to which may be attached any suitable handle.

The operation of our device is as follows:—The air enters through a pipe 8 into the upper part of the space 7 where it is immediately in contact with the heated metal of the basin 1. From there it passes downward in a thin layer until it reaches the opening 9 and goes up through the grate into the fire.

It is thought that the operation of the shaking and dumping devices is sufficiently shown by the drawings without any special description. When the grate is shaken, the ashes will fall through into the lower part of the ash-pocket 4, resting on the lid 18, from which they can at any time be dumped by drawing on the rod 22, which tips the lid into the position shown by the dotted lines in Fig. 2. The lid automatically closes by the action of the spring 19, on releasing the handle 22.

We claim as our invention and desire to secure by Letters Patent:

1. The combination in a forge, of exterior and interior basins separated by an air space and provided with central openings, a grate mounted in the central opening of said interior basin, means for connecting said air space with a source of air supply, means for shaking the grate, said means comprising a revoluble plate closing the opening in said exterior basin and supporting said grate, and a shaft for revolving said plate.

2. The combination in a forge, of an interior basin having a grate opening therein, a grate for said opening, an exterior basin surrounding the interior basin and spaced therefrom to provide an air passage between said basins, means permitting air to be introduced to said passage, the exterior basin having a portion projecting below the interior basin and means extending across the upper end of said projecting portion for closing the upper portion thereof when the grate is in its normal position for directing the air in the air passage through the grate opening, said means also having a connection with the grate for shifting the same.

3. The combination in a forge, of an interior basin having a grate opening therein, a grate for said opening, an exterior basin surrounding the interior basin and spaced therefrom to provide an air passage between said basins, means permitting air to be introduced to said passage, the exterior basin providing an ash pot having a portion projecting below the interior basin and means in said projecting portion for closing the upper portion thereof when the grate is in its normal position for directing the air in the air passage through the grate opening, and a removable closure for the lower end of said projecting portion to permit the removal of the ashes therefrom.

4. The combination in a forge, of an interior basin having a grate opening, a grate therefor, an exterior basin surrounding said interior basin and spaced therefrom, means for introducing air into the space between said basins, the exterior basin having extending thereacross a shaker upon which the grate is loosely seated and spaced from the horizontal portion thereof to provide an unobstructed air supply opening to the interior basin, and a handle for operating said shaker.

5. The combination in a forge, of an interior basin having an opening in its lower portion, a grate for said interior basin disposed within the opening, an exterior basin surrounding the interior basin and spaced therefrom, said exterior basin having a depending ash receiving portion, means for introducing air to the space between said basins, and means carried by the exterior basin and closing the upper end of the ash receiving portion and coöperating with the grate for shifting the same, said means comprising a rocking bar upon which the grate rests.

6. The combination in a forge, of an interior basin having a grate opening, a grate therefor provided with a socket, an exterior basin surrounding said interior basin and spaced therefrom, means for introducing air into the space between the said basins, the exterior basin having extending thereacross a shaking bar provided with an upstanding part adapted to enter each socket within the grate to support said grate and rock the same upon the rocking of the shaker, substantially as described.

LEONARD F. TARBELL.
JAMES W. TARBELL.

Witnesses to signature of Leonard F. Tarbell:
    FRED S. PEEK,
    VERNE SECKER, Witnesses to signature of James W. Tarbell:
    HARRIET L. LAWRENCE,
    MINETTE VAN DEUSEN.